July 22, 1930.  J. E. FERNLY  1,771,210

STROBOSCOPE

Filed March 1, 1926

WITNESS:

INVENTOR
Joseph E. Fernly
BY
Busser and Harding
ATTORNEYS.

Patented July 22, 1930

1,771,210

UNITED STATES PATENT OFFICE

JOSEPH E. FERNLY, OF PHILADELPHIA, PENNSYLVANIA

STROBOSCOPE

Application filed March 1, 1926. Serial No. 91,358.

My invention relates to apparatus whereby a machine operating at normal speed but with a rapidity which is too great to permit of observation under ordinary conditions, may be observed as if it were stationary or as if it were moving at a low speed. The invention comprises a simplified apparatus whereby a machine or machine element may be intermittently illuminated exactly once in each revolution, or cycle of operation, of the machine or machine element to be observed, or at regular intervals slightly departing therefrom. If the machine be rotating at a sufficiently high speed, the illuminations will recur at such rapid intervals as to produce the optical illusion of continuous illumination. If the illuminations be made to occur precisely once in each revolution, or each complete cycle of movement, of the machine or machine element to be observed, such machine or machine element will be apparently stationary. If the illumination be made to occur at intervals slightly varying from once in each revolution, or each complete cycle of movement, of the machine or machine element, the optical effect will be that of a machine moving at a relatively slow speed, which apparent slow speed will vary dependent on the extent to which the number of illuminations depart from the number of rotations, or cycles of operation, of the machine or machine part.

By means of my invention, the conditions required to produce the optical illusion of a stationary machine, or a machine rotating or moving at any desired relatively slow speed, may be predetermined by very simple mechanical expedients. By my invention, also, a moving machine may be so illuminated that it will be apparently stationary at any predetermined point in its complete cycle of operation. A preferred embodiment of the invention is shown in the drawings, in which—

Figure 1:
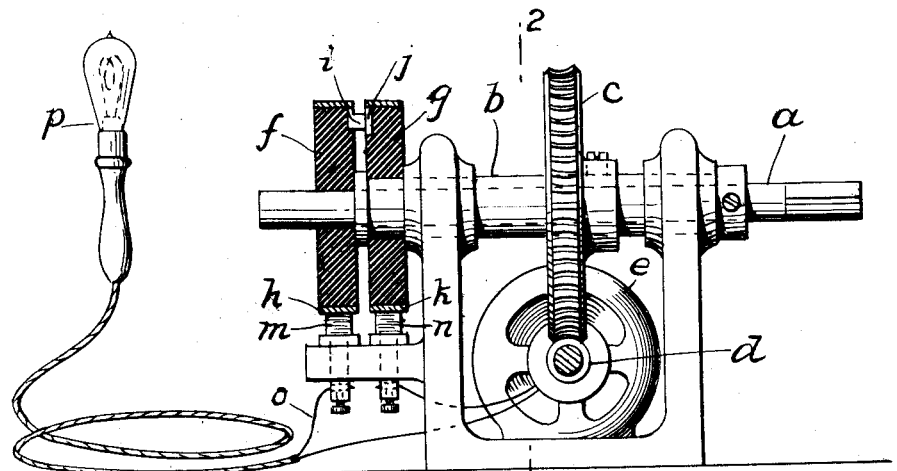
Figure 1 is an elevation partly in section of apparatus embodying my invention.
Figure 2:
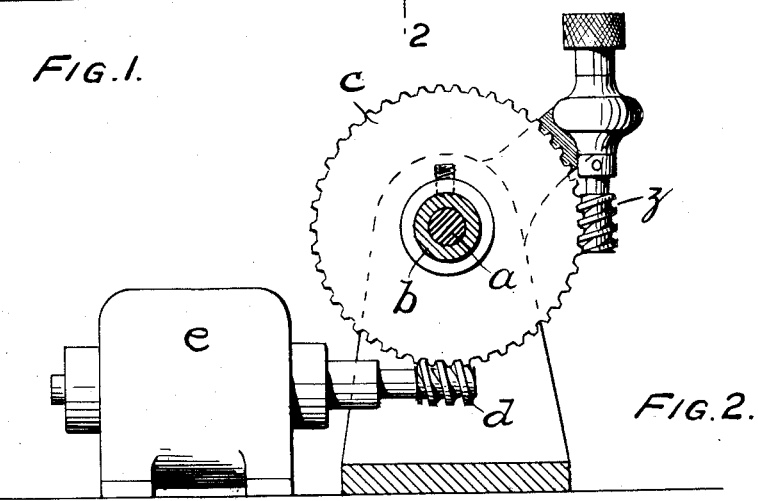
Figure 2 is a cross section on line 2—2 Figure 1.

The shaft $a$ is adapted to be coupled to any machine that it is desired to observe during operation. Another shaft $b$, adapted to be held stationary and also to be driven independently, is conveniently made, to achieve compactness, in the form of a hollow shaft arranged concentric with shaft $a$. Any suitable means may be provided for driving shaft $b$, as for example, a motor $e$ driving a worm $d$ and a worm wheel $c$, the latter being secured to shaft $b$.

Shafts $a$ and $b$ are adapted to drive contacts of an electric circuit in such manner that the contacts engage and close the circuit at intervals dependent on the relative speeds of the two shafts. A simple and compact construction is shown in the drawings. Shaft $a$ extends beyond shaft $b$ and carries a disc $f$ of insulating material having on its periphery a ring $h$ of copper or any other electrically conductive material. Shaft $b$ carries a similar disc $g$ with a similar peripheral electrically conductive ring $k$. Embedded in the face of disc $g$, which opposes disc $f$, so as to be about flush with such face, is a contact $j$ electrically connected with ring $k$. Electrically connected with ring $h$ and projecting from the face of disc $f$, which opposes disc $g$, so as to about span the space between the discs, is a contact $i$. Brushes $m$ and $n$ have a rubbing contact with rings $h$ and $k$ and are included in an electric circuit $o$, in which is also included any intermittently operable device $p$, preferably portable, by means of which light may be transmitted to the machine, or any element thereof which is to be observed. The device may comprise a shutter which, on the closing of the circuit, moves into position to allow light, natural or artificial, to be thrown on the machine element to be observed; or it may be a lamp, such as a neon bulb, capable of responding quickly to the closing and opening of an electric circuit; or it may be any other suitable light producing or transmitting intermittently operable device.

Let it be assumed that it be desired to observe any machine element, such as a section of a fly wheel, or a piston at any given point in its stroke, while it is in operation and as if it were stationary. The shaft $a$ is coupled to the machine so that it makes one complete rotation for each complete cycle of operation of the machine element, say a fly wheel, to be observed. Shaft $b$ remains stationary. Therefore, at each complete rotation of the fly wheel, the intermittent illuminant $p$, say a lamp, will flash and illuminate the part of the fly wheel under observation. If the wheel be rotating at a rapid rate, say a thousand revolutions per minute, the lamp will flash a thousand times per minute. The effect will be to give an apparently continuous illumination of the fly wheel or the part thereof that is being observed. This produces the optical illusion of a stationary fly wheel, and any part thereof can be observed, while the wheel is rotating at a high velocity, as if it were stationary.

It may be desired to observe the machine element, while it is operating at a high speed, as if it were operating at a low speed. To effect this, shaft $b$ should be driven at the speed at which it is desired to have the machine element apparently move. Let it be assumed that the machine element is rotating at any actual high speed, for example one thousand revolutions per minute, and that it is desired to produce the optical effect of rotation at ten revolutions per minute. To produce this effect, shaft $b$ is driven from motor $e$ at ten revolutions per minute. The machine will then be illuminated at intervals each of which equals the time occupied by the machine in making one and one hundredth parts of a revolution or complete cycle of movement. To the eye there will be then an apparent movement of the element being observed at a speed equal to that of shaft $b$.

It will be understood that, irrespective of the actual speed of the machine element being observed (provided such speed is sufficient to cause light flashes sufficiently close together to produce the illusion of continuity), the apparent speed of such machine element will correspond to the speed of shaft $b$.

Figure 3:
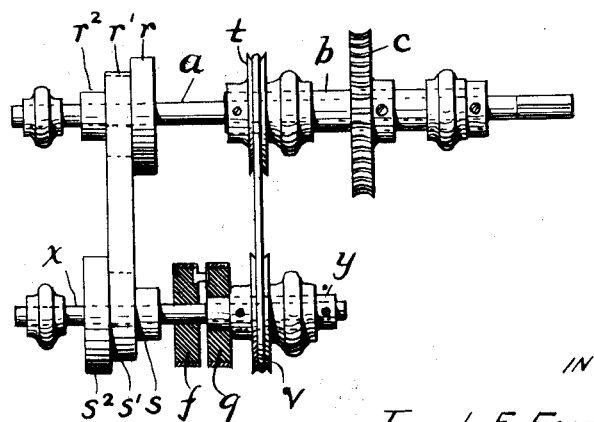
Figure 3 shows in plan a modified form of my invention.

It may be that the speed of the element to be observed is a fractional part, or a multiple, of the speed of the machine shaft that is directly coupled to the shaft. The crank shaft and cam shaft of an internal combustion engine afford a good example of different machine parts one of which travels at a speed multiple time that of the other. In such case special means must be provided to cause the circuit to be closed precisely once at each cycle of movement of the element to be observed (assuming shaft $b$ to be stationary). This can be effected by means of any one of many possible different slight additions to or modifications of, the simplified apparatus shown. One way of providing for conditions of this kind is shown in Fig. 3. In this figure, discs $f$ and $g$ are not mounted directly on shafts $a$ and $b$. Instead there are mounted on shaft $a$ pulleys $r$, $r^1$ and $r^2$ of different diameters and on shaft $b$ a pulley $t$. On two axially aligned shafts $x$ and $y$, arranged parallel to shafts $a$ and $b$, are respectively mounted pulleys $s$, $s^1$ and $s^2$ and pulley $v$. Shafts $x$ and $y$ carry respectively discs $f$ and $g$. If the pair of pulleys $t$ and $v$ are of the same diameter, and if the pair of pulleys $r^1$ and $s^1$ are of the same diameter and if the pulleys of each pair are belted together, the conditions will be the same as if discs $f$ and $g$ were mounted directly on shafts $a$ and $b$; but if pulley $r$ be assumed to have twice the diameter of pulley $s$ and if these pulleys be belted together, then shaft $x$ will rotate at twice the speed of shaft $a$. If, therefore, shaft $a$, when coupled to the main shaft of the machine, rotates at half the speed of the particular machine element to be observed, then shaft $x$ will rotate at precisely the speed of such machine element. Similarly, if pulley $s^2$ be twice the diameter of pulley $r^2$ and if these pulleys be belted together, shaft $x$ will rotate at half the speed of shaft $a$. Pulleys $r^2$ and $s^2$ would be so connected in case the shaft $a$, when coupled to the main shaft of the machine, rotates at twice the speed of the particular machine element to be observed.

By increasing the number of pulleys on shafts $a$ and suitably proportioning their diameters, provision may be made for rotating shaft $x$ at any desired number of different speeds relative to the speed of shaft $a$. It will, of course, be understood, that, in the modification shown in Fig. 3, shaft $y$ may be directly driven from motor $e$, in which case shaft $b$ and pulleys $t$ and $v$ would be functionless and may be omitted.

It may be desired to intermittently illuminate a moving machine or machine element repeatedly when it is at one particular point in its cycle of movement. In such case, shaft $b$ must be so adjusted that the electric circuit will be closed at the instant at which the machine arrives at this point in its cycle of movement. Shaft $b$ should therefore be turnable manually on its axis. To conveniently effect this adjustment, a worm $z$ on a manually turnable shaft may engage worm wheel $c$.

It is obvious that the structural details shown and described may be modified without departure from the essential inventive features of the apparatus.

Where, in the claims, reference is made to the speed of the independently driven element, it is intended to include all speeds, including zero, that will, in the defined combination, create the optical illusion of a machine or machine element that is stationary or that is moving at a speed different from its actual speed.

I claim:

1. In a stroboscope for observing the operation of a machine or an element thereof while the machine is in operation, a member arranged to be driven in predetermined timed relation with such machine through a predetermined cyclical path, a second member, means for driving the second member at relatively low speed through a corresponding cyclical path so that in various positions of the second member the members may intermittently bear operative relationships with each other, means operative to render visible the parts of the machine to be observed, and means for rendering said last named means operative when the members enter into the said operative relationships.

2. In a stroboscope for observing the operation of a machine or an element thereof while the machine is in operation, a contact member arranged to be driven in predetermined timed relation with such machine through a predetermined cyclical path, a second contact member, means for driving the second member at relatively low speed through a corresponding cyclical path so that in various positions of the second member the contact members may enter into operative relationship, means operative to render visible the parts of the machine to be observed, and electrical means for rendering said last named means operative upon operative relationship of the contact members.

3. In a stroboscope for observing the operation of a machine or an element thereof while the machine is in operation, a contact member arranged to be driven in a circular path in predetermined timed relation with such machine, a second contact member, means for driving the second member at relatively low speed in a parallel circular path so that in various positions of the second contact member the contact members may enter into relative relationship, means operative to render visible the parts of the machine to be observed, and electrical means for rendering said last named means operative upon operative relationship of the contact members.

4. In a stroboscope for observing the operation of a machine or an element thereof while the machine is in operation, a member arranged to be driven in predetermined timed relation with such machine through a predetermined cyclical path, a second member arranged to be driven through a corresponding cyclical path independently of the first member and without affecting its operation, so that in various positions of the second member the members may intermittently bear operative relationships with each other, means operative to render visible the operating parts of the machine to be observed, and means for rendering said means operative when the members enter into said operative relationships.

In testimony of which invention, I have hereunto set my hand, at Philadelphia, Pennsylvania, on this 27th day of February, 1926.

JOSEPH E. FERNLY.